Aug. 26, 1969   A. R. SACCOCCIO ET AL   3,462,808
EAR CLIP

Filed Aug. 22, 1968   2 Sheets-Sheet 1

INVENTORS
ANTHONY R. SACCOCCIO
HENRY P. HUSSERL
BY /s/ Salter & Michaelson
ATTORNEYS Aug. 26, 1969    A. R. SACCOCCIO ET AL    3,462,808
EAR CLIP Filed Aug. 22, 1968    2 Sheets-Sheet 2

INVENTORS
ANTHONY R. SACCOCCIO
HENRY P. HUSSERL
BY *Salter & Michaelson*
ATTORNEYS United States Patent Office 3,462,808
Patented Aug. 26, 1969

3,462,808
EAR CLIP
Anthony R. Saccoccio, 30 St. Mary's Drive, Cranston, R.I. 02920, and Henry P. Husserl, Providence, R.I.; said Henry P. Husserl assignor to Anthony R. Saccoccio, Cranston, R.I.
Filed Aug. 22, 1968, Ser. No. 754,547
Int. Cl. A44b 21/00
U.S. Cl. 24—248                                2 Claims

ABSTRACT OF THE DISCLOSURE

An ear clip for use in earrings and the like comprising a bracket having a shaft fixed against rotation and a clamping arm having a rolled portion surrounding said shaft, whereupon said arm may be swung with respect to said shaft, said shaft and said rolled portion being configured and dimensioned so that a frictional drag is imparted as said arm is swung with respect to said shaft, said frictional drag serving to maintain said clamping arm in any desired position of adjustment.

Background of the invention

Ear clips involving a swingable clamping arm are old and well known in the art, but traditionally clips of this type, known in the art as "pressure clips," are spring loaded, whereupon the clamping arm resiliently grips the ear lobe of the wearer. Ear clips of this type have been found to have many disadvantages. First of all, the spring pressure of the clamping arm against the wearer's lobe frequently causes discomfort and pain to the wearer. On the other hand, after repeated usage, the spring loaded clip frequently loses its resiliency, whereupon the clip does not securely engage the wearer's lobe. Attempts have been made to overcome these problems by providing spring loaded pressure clips wherein the spring tension can be adjusted, but these attempts have been only partially successful and, furthermore, result in an ear clip that is more complicated and expensive to manufacture.

Additional attempts have been made to overcome the above problems by the provision of ear clips that work on a friction principle. Examples of such clips are found in U.S. Patent No. 2,433,737 dated Dec. 30, 1947; U.S. Patent No. 2,745,264 dated May 15, 1956; and U.S. Patent No. 3,237,266 dated Mar. 1, 1966. In all of these patents, a frictional drag is imparted as the clamping arm swings with respect to its mounting bracket, said friction serving to maintain the clamping arm in any desired position of adjustment. Ear clips of this general type have enjoyed some degree of success, and the instant invention is directed to an ear clip of this general type.

Summary of the invention

The instant invention relates to an ear clip comprising a bracket having mounted thereon a shaft that is nonrotatable with respect to said bracket. Mounted on the shaft and swingable with respect thereto is a clamping arm, said clamping arm having a rolled portion that surrounds the shaft, said shaft and said rolled portion being configured and dimensioned so that a frictional drag is imparted as the clamping arm is swung with respect to the shaft. This frictional drag serves to maintain the clamping arm in any desired position of adjustment. Since the frictional interaction between the shaft and the rolled portion of the clamping arm takes place over the entire length of the shaft and the rolled portion, there is less likelihood of the clamping arm loosening with respect to the shaft after repeated usage, which loosening would obviously render the ear clip ineffective.

It is therefore a primary object of the instant invention to provide an ear clip wherein the clamping arm moves smoothly and without excessive being applied thereto but wherein the clamping arm is nevertheless maintained in any desired position of adjustment by frictional interaction between the clamping arm and the shaft on which it is mounted.

Another object of this invention is the provision of an ear clip that may be easily adjusted by the wearer to a position of maximum comfort but which, when so positioned, will remain firmly in place on the wearer's lobe.

A further object is the provision of an ear clip of the character described wherein a minimum number of parts are necessary, thus resulting in a construction that is economical to manufacture and assemble.

Another object is the provision of an ear clip that is durable and effective in use and which, if desired, may be of relatively small construction, thus enhancing the aesthetic appeal of the device.

Other objects, features and advantages of the invention will become apparent as the description thereof proceeds when considered in connection with the accompanying illustrative drawings.

Description of the drawings

In the drawings which illustrate the best mode presently contemplated for carrying out the present invention.

Description of the invention

Figure 3:
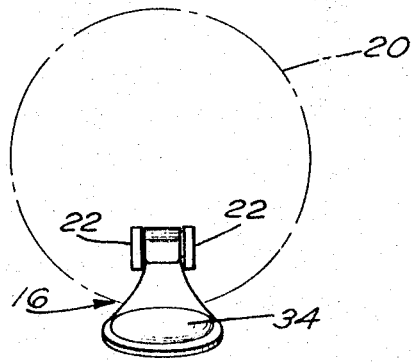
FIG. 3 is a rear elevational view of the ear clip shown in FIG. 2.
Figure 4:
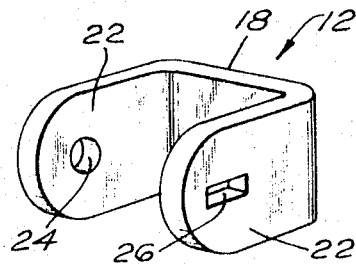
FIG. 4 is a perspective view, on an enlarged scale, of the bracket which forms a part of the instant invention.

Referring now to the drawings, an ear clip constructed in accordance with the instant invention is shown generally at 10 and comprises a bracket shown generally at 12, a shaft shown generally at 14, and a clamping arm shown generally at 16. As will be seen most clearly in FIG. 4, bracket 12 comprises a base plate 18, the front surface of which is adapted to receive any suitable ornamentation, such as disc 20 shown in broken lines in FIGS. 1, 2 and 3. It will be understood that any desired ornamental member may be secured to bracket 12, and the method of securement forms no part of the instant invention although an ornamental member, such as disc 20, would normally be soldered to the front surface of base plate 18. Extending rearwardly from base plate 18 are a pair of spaced, substantially parallel lugs 22, said lugs preferably being integrally formed with base plate 18. As will be seen most clearly in FIG. 4, each of the lugs 22 has an opening therein, and, more specifically, one of the lugs has a circular opening 24, while the other lug has a noncircular opening, such as the rectangular opening shown at 26.

Figure 5:
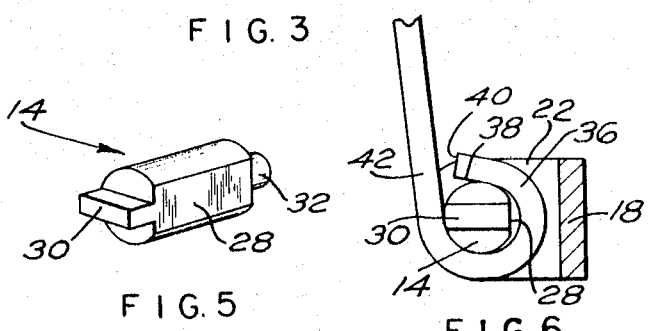
FIG. 5 is a perspective view, on an enlarged scale, of the shaft which forms a part of the instant invention.

The openings 24 and 26 are in alignment with each other so as to receive the shaft 14. As will be seen most clearly in FIG. 5, the shaft 14 is of circular configuration in cross section except for a flat section 28 that is provided for reasons hereinafter to be made apparent. At one end of shaft 14 a rectangular pintle 30 is integrally provided, it being understood that the pintle 30 is received within opening 26. At the other end of shaft 14, there is provided a circular pintle 32 which is received in the opening 24. Due to the engagement of the noncircular pintle 30 in the noncircular opening 26, it will be understood that when shaft 14 is mounted in bracket 12, it will be nonrotatable with respect thereto. The bracket 12 and shaft 14 are constructed of any suitable metallic material, although a relatively hard metal, such as steel or nickel silver, is preferred.

The clamping arm 16 is also of metallic material, although preferably of a softer metal, such as brass. Clamping arm 16 comprises an ear engaging portion 34 at one extremity thereof and a rolled portion 36 at its opposite extremity. It is important to note that the rolled portion 36 is generally circular but terminates in a flat or straight portion 38, it being further noted that the end 40 of the rolled portion is spaced from the intermediate section 42 of the clamping arm. In other words, the rolled portion 36 does not form a completely enclosed loop. As will be seen most clearly in FIGS. 6 through 9, the rolled portion 36 surrounds shaft 14. More specifically, when assembling the shaft 14 within rolled portion 36, the flat 28 on shaft 14 is aligned with the flat 38 as illustrated in FIG. 9, whereupon the shaft may be freely and easily slid within the rolled portion, after which the bracket 12 may be easily assembled to shaft 14, which may be easily accomplished by having the lugs 22 in slightly diverging relationship, whereupon the lugs may be pressed inwardly so that the openings 24 and 26 receive pintles 32 and 30, respectively.

Figure 6:
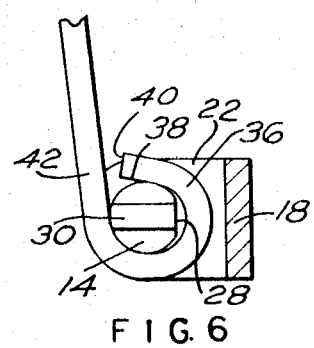
FIG. 6 is an enlarged fragmentary view, partly in section, showing the ear clip in the same position as shown in FIG. 1.
Figure 7:
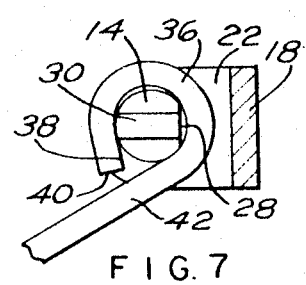
FIG. 7 is an enlarged fragmentary view, partly in section, showing the ear clip in the same position as shown in FIG. 2.
Figure 8:
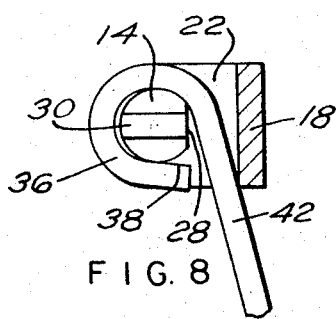
FIG. 8 is an enlarged fragmentary view, partly in section, showing the ear clip in completely open position.
Figure 9:
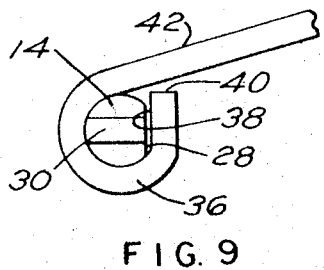
FIG. 9 is an enlarged fragmentary side elevational view showing the relative position of the clamping arm and the shaft during assembly.

As will be obvious, with the clamping arm and shaft assembled as illustrated in FIG. 9, movement of the clamping arm with respect to the nonrotatable shaft will result in a frictional drag being imparted. This is because the distance from flat 38 to the diametrically opposite point of rolled portion 36 is less than the diameter of the circular portion of shaft 14. Thus, as the clamping arm is rotated with respect to the shaft, as illustrated in FIGS. 6 through 8, the rolled portion of the clamping arm will frictionally grip the shaft, this frictional grip being further enhanced by the fact that rolled portion 36 has some degree of resiliency due to the fact that the rolled portion does not form a completely closed loop. This resiliency is enhanced by the use of a metal, such as brass, it being further noted that relative movement of the brass clamping arm on the harder shaft 14 will result in less wear on the parts. It should be understood, however, that the invention would still be operative if a harder material, such as steel or nickel silver, were used for the clamping arm. It will be obvious that the extent of frictional drag that exists when clamping arm 16 is moved is dependent upon the relative configurations and dimensions of rolled portion 36 and shaft 14; and by making a slightly larger flat on the shaft and the rolled portion, or by using a rolled portion that has greater strength and less resilience, a greater degree of friction will exist.

Figure 1:
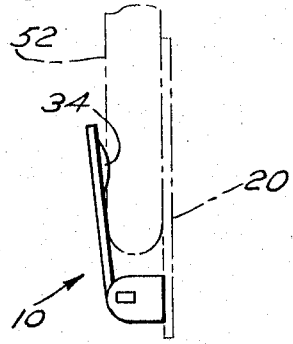
FIG. 1 is a side elevational view of an ear clip constructed in accordance with the instant invention in operative position on a wearer's lobe.

When the clamping arm and shaft are in their assembled position of FIG. 9, with the flats aligned, it will be that the mounting of the clamping arm on the shaft is a relatively loose one. For this reason, the flat 28 of shaft 14 is positioned so as to face base plate 18 in substantially parallel disposition, since once the parts have been assembled, including bracket 12, the clamping arm will not be able to assume the position of FIG. 9 due to the fact that in operation FIGS. 1 and 6 illustrate the approximate closing extent of the ear clip, while FIG. 8 illustrates the maximum opening position thereof. Thus, since in operation and after assembly the parts can never assume the position illustrated in FIG. 9, it will be seen that there is always the desired frictional interplay between shaft 14 and clamping arm 16.

Figure 10:
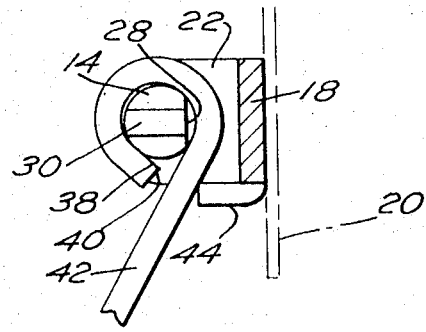
FIG. 10 is an enlarged fragmentary view, partly in section, showing a slightly modified form of the instant invention.
Figure 11:
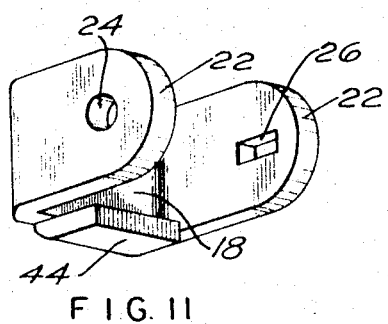
FIG. 11 is an enlarged perspective view of the bracket shown in FIG. 10.

FIGS. 10 and 11 show a slightly modified form of the instant invention wherein means are provided for restricting the extent of opening movement of the clamping arm 16. More specifically, a flange 44 is provided which extends rearwardly and integrally from the lower extermity of base plate 18, as clearly as illustrated in FIGS. 10 and 11. As will be seen most clearly in FIG. 10, the flange 44 serves to limit the degree of opening movement of the clamping arms. It will be understood that, with the exception of the addition of flange 44, the ear clip shown in FIGS. 10 and 11 is structurally and functionally identical to the ear clip 10 shown in FIGS. 1 through 9.

Figure 12:
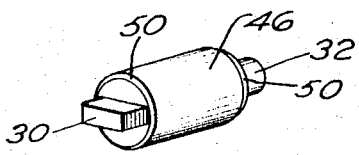
FIG. 12 is an enlarged perspective view of a slightly modified shaft construction.
Figure 13:
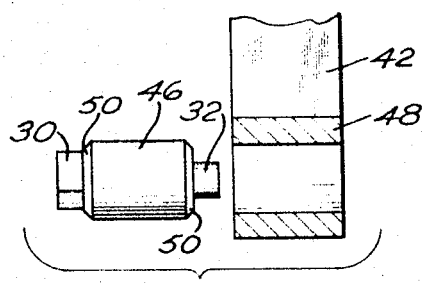
FIG. 13 is an enlarged fragmentary view, partly in section, illustrating assembly of the modified shaft of FIG. 12 with the clamping arm.
Figure 14:
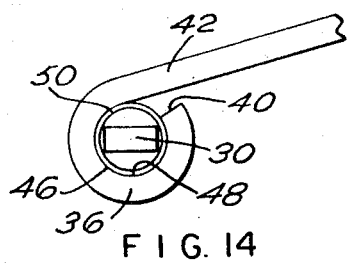
FIG. 14 is an enlarged fragmentary side elevational view of the modified shaft and clamping arm of FIG. 13.

FIGS. 12 through 14 illustrate still a further slightly modified form of the instant invention characterized by the fact that no flats are provided either on the shaft or the rolled portion of the clamping arm. More specifically, the shaft shown in FIG. 12 has a completely circular working portion 46 having the same noncircular and circular pintles 30, 32, at opposite ends thereof. In this form of the invention the rolled portion shown at 48 is also completely circular and is characterized by a diameter that is slightly smaller than the diameter of the shaft portion 46. Thus, in assembly the shaft portion 46 is forced into rolled portion 48; whereupon when once assembled, the same general friction action will exist. Chamfers 50 may be provided at opposite ends of shaft portion 46 to facilitate the insertion of the shaft into rolled portion 48.

Figure 2:
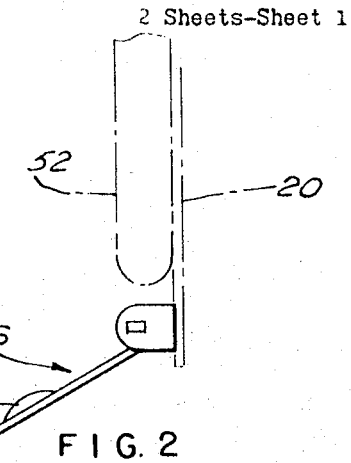
FIG. 2 shows the ear clip of FIG. 1 in open position.

In all forms of our invention, the frictional interaction between the clamping arm and the nonrotatable shaft on which it is mounted permit the clamping arm to be moved easily and smoothly to any desired position of adjustment, whereupon the existing friction will maintain the clamping arm in its adjusted position. Thus, when the clamping arm is moved to closed position, as illustrated in FIG. 1, the ear lobe 52 of the wearer will be gripped by the clamping arm in conventional fashion, but the wearer may readily adjust the degree of pressure exerted by the clamping arm to suit her own comfort. When it is desired to remove the ear clip, it is simply necessary to swing the clamping arm to open position such as illustrated in FIGS. 2 and 7. The fact that the frictional interaction takes place over the length of shaft 14 and rolled portion 36, plus the fact that the shaft is preferably constructed of a hard metal, such as steel or nickel silver, while the clamping arm is constructed of a softer metal, such as brass, both contribute to a durable action which will result in minimum wear on the parts. Wear on the parts is further minimized by the inherent resilience which exists in rolled portion 36, as previously described.

Certain changes could obviously be made in the aforedescribed structural embodiments without departing from the scope or spirit of the instant invention. For example, other suitable mechanical means could be employed for maintaining the shaft 14 against rotation with respect to the bracket 12; and, by way of illustration, the shaft could be slotted for receiving an integral tongue carried by the bracket. Also, the shaft 14 need not necessarily be a slotted pin as shown, but rather the shaft could be a hollow shaft formed from rolled sheet stock with integral pintles at either end.

What is claimed is:

1. In an ear clip, a bracket comprising a base plate adapted to receive ornamentation on one surface thereof and having a pair of substantially parallel spaced lugs extending rearwardly from the other surface thereof, a shaft mounted in said lugs and extending therebetween, means for preventing rotation of said shaft with respect to said lugs, and a clamping arm operatively connected to said shaft, said clamping arm having an ear engaging portion at one extremity and having a rolled portion at its opposite extremity surrounding said shaft whereupon said clamping arm is swingable with respect to said shaft between an ear engaging position and an open position, said shaft having a cross dimension larger than a cross dimension of said rolled portion whereby a frictional drag is imparted as said clamping arm is swung with respect to said shaft, said frictional drag serving as the sole means for maintaining said clamping arm in any desired position of adjustment, said shaft and said rolled portion each being substantially round in cross section and each having a corresponding flat section, said rolled portion being freely slidable onto said shaft when said flat sections are aligned.

2. In the ear clip of claim 1, said shaft flat section being positioned so that it faces said base plate and is substantially parallel with respect thereto.

References Cited

UNITED STATES PATENTS

| 1,875,420 | 9/1932 | Cooper | 24—252 |
| 1,979,375 | 11/1934 | Fielding. | |
| 2,635,318 | 4/1953 | Gloss | 24—248 E |

DONALD A. GRIFFIN, Primary Examiner

U.S. Cl. X.R.

63—14